April 18, 1967     D. M. GOODMAN     3,315,160
ELECTRONIC CIRCUIT TESTING METHOD AND
APPARATUS EMPLOYING OPTICAL FIBER
RADIATION SENSORS Filed June 23, 1961     3 Sheets-Sheet 1

*INVENTOR.*
DAVID M. GOODMAN

INVENTOR.
DAVID M. GOODMAN

United States Patent Office 3,315,160
Patented Apr. 18, 1967

3,315,160
ELECTRONIC CIRCUIT TESTING METHOD AND APPARATUS EMPLOYING OPTICAL FIBER RADIATION SENSORS
David M. Goodman, 3843 Debra Court, Seaford, N.Y. 11783
Filed June 23, 1961, Ser. No. 119,221
30 Claims. (Cl. 324—73)

This invention relates to the use of electro-optical monitoring devices for testing operative electronic systems. In particular, it relates to the generation and transmission of light signals representative of the behavior of components and sub-assemblies within an operative system for the purpose of analysis, control, and maintenance thereof.

In electronic systems which contain thousands of electronic components failures are expected which will impair the operation of the system. Much has been said, as a consequence, and much has been done to reduce the incidence of failure. Nevertheless, even with good design, careful selection of components, sound construction, and rigorous inspection procedures failure rates exist in electron systems today that create a severe problem. The larger the number of active components, the more severe the problem. Often the time consumed for testing substantially reduces the time left for useful operation. In a complex system this sometimes causes testing to become a full time effort. It is imperative, therefore, that time to test and time to repair be kept at a minimum.

Partially in recognition of this problem, automatic testing techniques have been introduced in recent years. First there was the stepping-switch programmed, internally wired, programmer-comparator which was used for automatic testing. This technique decreased test time but was considered to be inflexible with regard to changes in the system subject to test. To avoid this limitation and to otherwise make more flexible the programming of test stimuli, and measurement of response, the punched-tape sequentially programmed device was introduced to replace the pre-wired stepping switch. This technique of tape programming has improved the situation in certain cases but these test devices are large and complex; and the programming, be it on punched tape, magnetic tape, or cards, is difficult and expensive. Now being introduced, and still along lines that increase the complexity of the test equipment, is the computer type of device employing magnetic and delay line storage, rapid access, and simultaneous test. The extent to which these techniques have been used for maintenance purposes is summarized in documents SETE 230/4,5,6 which constitute the Lecture Notes for a Design Course in Automatic Electronic Test Equipment conducted at New York University in 1960. Also, disclosed in these documents is the sizeable effort which has been expended in an attempt to provide effective electronic test equipment for complex operational systems.

It is generally recognized at this time that although these automatic techniques are useful in many applications they fail to provide the simplicity of test that is desired in operational systems. The programmer-comparator, for example, carries with it the need for stimuli generators and "adapter carts" before it can be connected to the equipment under test. The form that this assembly of test equipment has taken is of necessity complicated since a sequentially operated digital machine process is used to control and measure analogue electrical quantities. Furthermore, few systems provide, in suitable form, the test points which are required in this test arrangement. As a consequence the areas in which this type of automatic test equipment has proved successful has been limited. I believe the programmer-comparator has been effective in the following general situations: (1) in factory test of assemblies (or sub-assemblies or components) where a reasonable volume of identical items for test is involved, and (2) in factory test of assemblies where the total number of different tests is so great that human error may be expected to invalidate or obscure the results of test. Computer type automatic test equipment should also be effective in these areas.

Where externally programmed automatic test equipment has not proved effective is in the test of operational systems. The logic of test that is required to troubleshoot from the outside of a system, so to speak, is a difficult thing to work out and set forth. The programming that is necessary to carry out a suitable test sequence is a major consideration. Then, to carry out the requisite tests a sizeable amount of external equipment is required (as noted above) which in itself is complicated and expensive. Finally; the logic, programming, and external test equipment must be carefully reviewed whenever a change is made in the system under test. The net result is that, notwithstanding intensive design effort and elaborate equipment, severe doubts are cast on the usefulness of this technique. It should have been anticipated more generally that in this class of equipment the external stimuli generators and the control and measurement sequence, provided by the programmer-comparator and adaptor-cart combination, are superfluous since often these means are already contained in the equipment or system under test. By using these internal means for test purposes as well as for their primary purpose considerable savings can be achieved, as will be seen. Considerable confusion has arisen, nevertheless, at this time from the all-too-frequent application of the external programmer-comparator for testing of operational systems.

It is an object of this invention, therefore, to overcome the disadvantages and uncertainties that exist in the test procedures presently used for the maintenance of complex electronic systems. This is accomplished by providing sensors that utilize long life, light-weight, and reliable probes comprised of magnetic materials, semi-conductors, and phosphors which are used to monitor the operative components in an electronic system.

It is a concomitant object of this invention to provide simple and reliable means which respond to an action of an operative component so that electro-magnetic radiation is generated which indicates the state of energization of the component.

It is another object of this invention to provide optical fiber means whereby electro-magnetic radiation emitted from an operating component is transmitted to provide test signals.

It is a further object of this invention to provide a means of testing whereby it is not necessary to make circuit changes in the equipment under test for the purpose of testing.

It is a further object to provide an optical test point matrix so that test signals generated within a unit may be transferred to a location external of the unit; and to do so without concern for electrical breakdown.

It is still another object of this invention to provide means for testing and for display of the results of test whereby the overall combination is low-weight, reliable, and rugged; consumes little power; and can transmit data at a high rate of speed.

It is a further object to provide a versatile general purpose test and display instrument comprised of an optical probe, detector, amplifier, and oscilloscope connected in tandem.

It is another object of this invention to provide means which will make it possible to rapidly test large and complex systems so that the users thereof will have a current and continuously updated display describing the status of the system.

To achieve these ends this invention makes use of the electric or magnetic field that electronic components have when energized. Often this field is intense and external of the component which makes it easy to measure. The field may be static, it may be alternating, or it may comprise electro-magnetic radiation. These fields may be detected in many ways. For example, phosphors are distinguished in their ability to emit light when they are excited by electro-magnetic radiation. Electro-luminescent materials and other semi-conductors also are distinguished in their ability to detect the presence of electric and magnetic fields. It will be shown that by placing sensors comprised of materials of this type in strategic positions it is possible to trouble-shoot a complex electronic system almost instantaneously. When necessary this can be done without making direct electrical connections into the system. This invention then uses optical fibers to transmit "light" signals representative of the level of energization of the major units in a system under test to where these signals are examined. The examination or measurement of the "light" signals is done rapidly and need only locate failure to a replaceable unit or assembly. When desirable, however, the logic of test may be made to pin-point the component or sub-assembly which has failed. The measurement, for test purposes, of the external fields which are normally associated with the components within an operative system, and the transmission of data by rugged optical fibers, contains the basic elements of simplicity and reliability which have been lacking in prior test arrangements.

Other objects, features, and many of the attendant advantages of this invention will be more readily appreciated as the same becomes better understood by reference to the following detailed description when considered with the accompanying drawings wherein.

Figure 1:
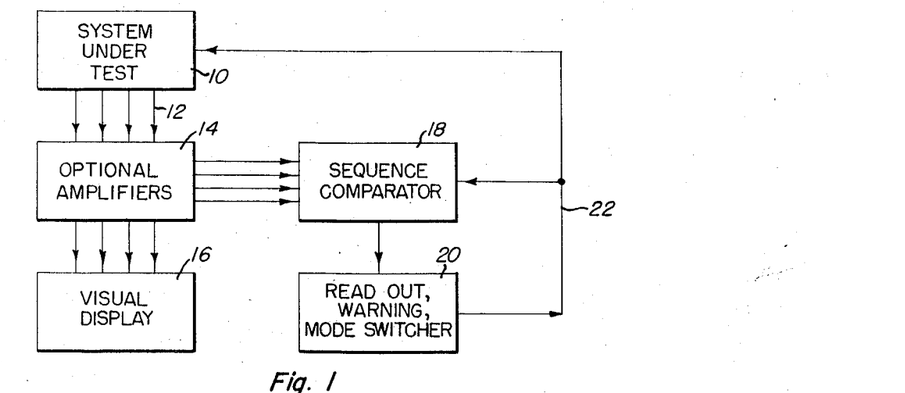
FIGURE 1 is a block diagram which shows a figurative embodiment of this invention.

In FIGURE 1, system under test, 10, has a plurality of output signal leads, 12. The signals contained on these leads are derived from various points within system 10 and contain information that indicate the level of energization of components within the system. Amplifiers 14 are used when necessary to amplify the signals on leads 12. Although these signals may be electrical in nature, preferably they consist of electromagnetic radiation in the range from infra-red to ultra-violet thus making it possible for them to be transmitted by optical fibers. The signals are split into two parts, with a first set going to visual display device 16, and a second set going to sequence-comparator 18. The visual display 16 is for the benefit of an operator; the sequence-comparator 18 is used for unattended or automatic operation, or for the remote transmission of the test data.

In the preferred embodiment the output signal leads 12 carry visible radiation and they are arranged in matrix form to provide the display. The visible signals are presented to the operator in a symmetrical pattern within the matrix so that any departure from normality will be noticed rapidly. When the leads 12 carry electrical signals they may be converted to light for display purposes. The signals from system 10 are also fed into sequence-comparator 18 so that rapid automatic comparison can be made. The signals into 18 may be normalized so that a single reference may suffice for comparison purposes; alternatively, a plurality of different reference signals may be provided in means 18. The comparison of the input signals to the reference signal may be sequential, or parallel, or a combination thereof depending upon the system and purpose of test. Departures from normal system operation are detected via means 20. When drastic failure is detected means 20 may be used to cause system 10 to revert to an alternate mode of operation. Under these circumstances the command signals, transmitted via 22, also instruct sequence-comparator 18 to make suitable changes in the test sequence. The desirability of using an alternate mode of operation in this manner is dependent on the design of the system 10, and the operational requirements placed thereon. This alternate mode may or may not constitute a degraded mode of operation. Careful consideration of the intended method of operation of the entire system will dictate the choices available to the equipment designer.

Figures 2, 3, 4, 5, 6:
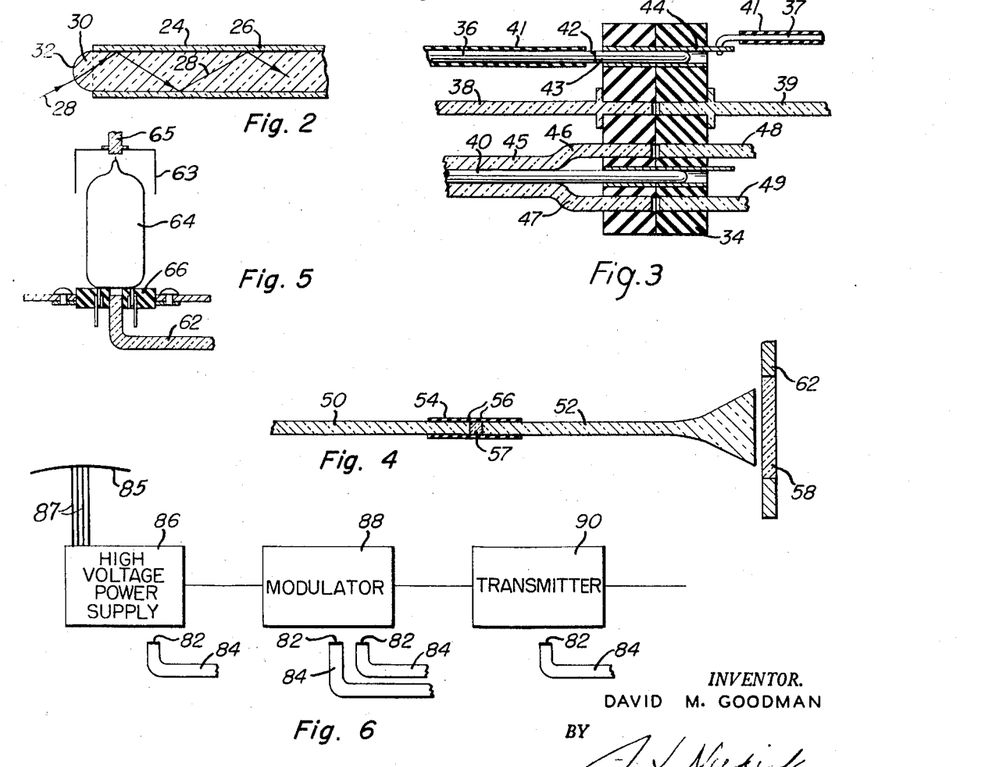
FIGURE 2 illustrates a cross section of an optical fiber which is used to transmit signals from a typical sensor.
FIGURE 3 illustrates a cable connector which joins electrical circuits and couples optical fibers.
FIGURE 4 shows two optical fibers joined by an optical signal modifier such as a wavechanger, attenuator, or filter. Also shown is a section of a display panel.
FIGURE 5 shows a tube socket with a light pipe which picks up and transmits radiation from the heater element of a vacuum tube. Also shown is a special tube shield with an optical connector.
FIGURE 6 shows in block form a power supply, modulator, and transmitter in association with phosphor detectors. Also shown is an optical cable leading from the power supply to a bulkhead, flush surface, or other suitable remote location.

In FIGURE 2, an optical fiber 24 is illustrated with a jacket 26. A light ray 28 is shown impinging upon spherical element 30. Phosphor coating 32 is shown deposited on surface 30. This coating provides light rays when excited, as by ultra-violet light or by particle radiation. By means of internal reflections, ray 28 may be transmitted for a considerable distance along fiber 24. To state details on the properties of optical fibers used for the transmission of radiation, in the range from infra-red to ultra-violet, I quote from a recent publication of The American Optical Company which states:

"If the light shines on the end of a glass rod, much of the light that enters will be caught inside the rod, unable to escape out the sides because of total internal reflection. This light will be reflected a number of times from the walls and finally escape from the far end. The same thing happens when the diameter of the rod is made very small. In fact, there is no substantial change in the behavior till the diameter of the rod becomes comparable to the wavelength of light—say 5 microns, and a fiber 50 microns (0.002 in.) in diameter behaves just like a rod. Light is still trapped in the fiber by total internal reflection and carried to the far end. The only difference is an increase in the number of reflections per unit length, and the surface quality of a fiber must be very high if the light is not to be lost by surface scattering. A ray of light in a 50-micron fiber may be reflected 3000 to 4000 times per foot. If many such glass fibers are gathered together into an orderly array, they will transmit an image by breaking it up into separate components and transmitting each of these components independently from one end of the array to the other. It is clear that the fibers must be in exactly the same arrangements at each end or the picture will be scrambled or distorted at the exit end of the bundle, but the fibers need not be precisely arranged in the middle where the light is trapped. In the visible spectrum, a seven foot length of our fibers transmits about 50% of the light that enters the ends, and about 80% of the incident light enters the fibers . . . the violet cut-off is about 380 millimicrons, and the infra-red cut-off 2.7 microns. If the diameter of a fiber changes gradually along its length, the light trapped in it will be concentrated or spread out. If an oriented bundle of fibers with an image on one end is tapered, the image will be reduced or enlarged at the other end. It will be found that the light coming from an enlarged image is more nearly collimated than the light in the original image, and conversely that the light in a reduced image contains steeper rays than in the original image. A bundle of loose flexible fibers which is arranged in one pattern at one end can be arranged in some quite different pattern at the other end. The arrangement at one end may be orderly and at the other end random, in which case the function might be called 'scrambling.' By this method it is possible to code a message so that it cannot easily be read without an identical bundle for decoding. Many of the applications of fiber optics call for a flexible light-guide which does not need to transmit an image. It is easy for us to make such bundles of randomly arranged fibers, and they can be made any length up to 25 feet or more, depending on the amount of light attenuation which can be tolerated. We call such bundles 'incoherent' to distinguish them from 'coherent' bundles which transmit an image and in which the fibers are systematically arranged. Incoherent bundles are much cheaper than coherent bundles of the same dimensions."

In FIGURE 3, connector 34 is shown to join three types of signal leads as might emanate from system 10 of FIGURE 1. Conductor 36, is covered with insulation 41. A solder or crimp connection is made in the region 42, to pin 43. Electrical continuity to conductor 37 is made via tight fitting cylindrical member 44; conductor 37 is insulated at 41. This arrangement outlines a typical electrical cable connection. Optical fiber 38 is coupled to optical fiber 39 by bringing the end surfaces of 38 and 39 into juxtaposition as shown. Electrical conductor 40 is covered by an insulating layer 45 which contains optical fibers of the type illustrated in FIGURE 2. Two such fibers, or sets of fibers, are shown at 46 and 47. They may be coupled to fibers 48 and 49 by being brought together as illustrated for fibers 38 and 39. Thus, a cable comprised of optical fibers and electrical wires can be used to transmit a mixture of signals. When only one fiber per electrical conductor is used the color coding of either may be used to identify both; when more than one fiber is used it is possible to code the fibers by tinting them with different colors.

In FIGURE 4, optical fiber 50 is coupled to optical fiber 52, the two ends being held in juxtaposition by gripping means 54. Although flat surfaces generally will suffice ball and socket joints may be provided at 56 to enhance the coupling. Element 62 is a section of a plate on which the visible output of fiber 52 may be projected. The light transmitted by fiber 52 can be filtered or attenuated at position 58. Another method of modifying the transmitted light is shown at 57 where an optical section is inserted akin to a coaxial attenuator or filter of the electrical variety. These arrangements for attenuation and filtering make it possible to adjust the signals projected by each of the optical fibers.

Figure 11:
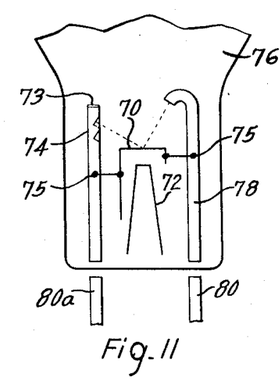
FIGURE 11 shows a method of picking up and conducting radiation from the cathode of a discharge device.

In FIGURE 5 there is illustrated optical member 62 which collects and transmits visible radiation from vacuum tube 64 when the filament therein is energized. The radiation is collected from the bottom of the tube via the hole in the central portion of tube socket 66. Alternatively, tube shield 63 may be fitted with an optical coupler 65 for the same purpose. In addition to filament on-off detection it is possible also to use radiation from the filament for control purposes. Thus, in FIGURE 11 cathode 70 is heated by heater 72, and insulators 74 and 78 support elements of the electron discharge device 76, as by pinning at 75. Radiation is transmitted from cathode 70 via light pipe means 78 to optical member 80. Light pipe means 74 may be serrated to pick up radiation from cathode 70. Reflector 73 sends this radiation down to optical fiber 80a. The radiation thus transmitted may be used to control the power supplied to heater 72 in order to keep the cathode at a constant temperature. This technique can be very useful in storage type cathode ray tubes, and other charged particle discharge devices, which are sensitive to changes in emission. An application of this technique to magnetron tubes is disclosed in my co-pending application Ser. No. 727,969, filed Apr. 11, 1958, now Patent No. 3,092,755, entitled, "High Power Vacuum Tubes." In such applications it is contemplated that the cathode temperature will be monitored as well as controlled; and the error voltage in the control circuits will be measured to estimate remaining useful life. Clearly, these features lead to optimum maintenance procedures.

Figure 8:
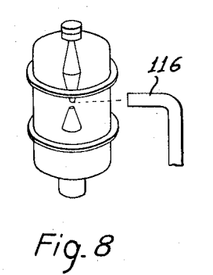
FIGURE 8 shows a TR tube with an optical element for sensing or stimulating the ionization of the gas within the tube.

In present day radar sets the TR tube is a prime source of difficulty insofar as testing is concerned. It is almost incapable of being tested directly; its failure is usually inferred from a series of indirect measurements. Such a tube is shown in FIGURE 8. According to the teachings of this invention, optical member 116 is positioned to pick up the radiation that is emitted by the tube. Via means 116 the signals representative of the tube discharges can be transmitted to measurement circuits for analysis, or for control. For example, in U.S. Patent 2,973,513 by Robert Hovda, a TR tube is used as a gaseous noise generator to check the sensitivity of a radar receiver. By means of techniques disclosed in my co-pending application, supra, it is possible to control and to calibrate the characteristics of the discharge, as transmitted by 116, so that positive fault isolation can be made between the TR tube and the radar receiver.

Figure 8A:
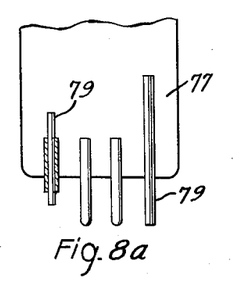
FIGURE 8(a) shows methods of conducting electromagnetic radiation, in the optical frequency range, from the interior of a discharge device.

Along these same lines, it has been reported that hydrogen thyratrons indicate that the end of their useful life is approaching by a change in the color of the discharge. Also, in vacuum discharge devices it is possible to detect onset of a gassy condition by means of the glow within the tube. Lastly, arcing due to breakdown or to intermittent shorts also will yield a visible output. Therefore, it is desirable to include light pipe means in all tubes characterized by this type of behavior. One suggested arrangement is illustrated in FIGURE 8a which shows light pipe member 79 emerging from discharge device 77. Member 79 may be brought out as an optical pin, or it may be contained within one of the electrical pins inasmuch as the optical fibers may be very thin and may be vacuum sealed within the metal pin.

Figure 7:
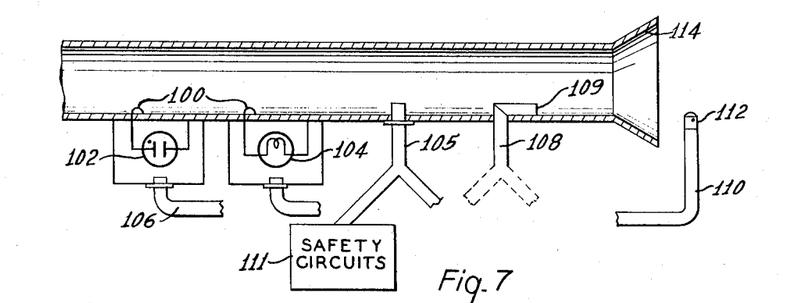
FIGURE 7 shows a waveguide section in combination with various optical monitoring devices. Also shown is an arc initiator which behaves as a non-destructive fuse.

Another troublesome portion of a radar set that is made easy to test by this invention is the waveguide section which couples the output tube to the antenna. Such a section is illustrated in FIGURE 7 together with monitoring probes as follows: (1) Coupling loops 100 are shown connected to neon indicator 102 and filament 104. The coupling loop is designed to pick up enough energy to cause 102 or 104 to emit light which is picked up and transmitted by member 106. (2) Member 108 is a light pipe which picks up and transmits light emitted if arcing occurs in view of the pick up end 109. (3) Member 110 transmits the radiation emitted by detector 112 which is responsive to the electromagnetic radiation from antenna 114. Member 112 may be located to respond to side lobe radiation whereby it becomes unnecessary to obstruct the forward view of the antenna. (4) Member 105 may be posted in the waveguide at a point of suitable voltage gradient so that it becomes a nondestructable fuse. Typically, the post is made of glass rod and may be hermetically sealed to the waveguide. The glass post may be coated and thus made electrically conductive. It may take many forms such as a hemi-cylinder, a cylinder, hemisphere, or sphere. The event of consequence is that when a breakdown occurs at the post it creates a visible discharge which is transmitted along member 105. Clearly, post 105 may be metallic and optical pick-up 109 may be turned about to achieve a similar result. Also, means 109 may be used as element 116 of FIGURE 8 when the waveguide configuration permits.

These features make it possible to control circuits which will safeguard the high power tube. Frequently, due to loss in pressurization, or to moisture in the system, or to severe mis-match, or for other reasons, an arc will be generated in a waveguide which travels back to the tube and punctures the window thereof. With the fuse-detector member 105 (or arc detector 108) controlling suitable safety circuits, 111, the tube and the high power modulator may be protected. Additionally, when failure is detected in this section of the system the test device may be arranged to show whether the guide or the tube is the defective component. Truly, this is a significant feature of this invention. Specific circuits are not disclosed since many possibilities exist. For example, the high voltage input to the tube may be reduced, attenuators may be inserted in the guide, or mechanical shutters may be employed. The net result is that a tube is protected which costs from hundreds to thousands of dollars to purchase, and which takes many hours to install and adjust.

Referring to FIGURE 6, a typical chain of high power electronic assemblies is outlined by power supply 86, modulator 88, and transmitter 90. Each of these packages is sensed by a phosphor 82 which may be inside the package; or outside as illustrated. During normal operation a certain level of radiation, often in the form of X-rays, will impinge upon each of the detectors 82. This radiation will be converted to light by the phosphor. This light will be transmitted through the optical light pipes or fibers 84 and will be proportional to the intensity of the radiation. In most designs the chain outlined in FIGURE 6 will provide sufficient "de-coupling" between the three packages so that sequential measurement of the radiation level will provide all the information necessary to determine if the chain is operating properly, or if not, to determine the faulty package. In those cases, however, where the assemblies feed back into each other with too much interaction for this to be the case it is possible to conduct simultaneous tests on these items. Also, sequential monitoring may be used until a need for more thorough examination is indicated in which case a simultaneous test mode can be introduced. Additionally, the test sequence can be made fast enough so that in effect a simultaneous test is achieved. This point will be developed later when television methods are used to process the test data.

Consider the situation where transmitter 90 contains a klystron amplifier designed to operate at 60 kv. with a power output of 1 megawatt, a pulse width of 0.1 microsecond, and a duty cycle of 0.001. A first sensor is used to monitor the average X-ray activity; a second sensor is used to monitor the peak X-ray activity. For the first sensor a phosphor is chosen with a decay time which exceeds 1 millisecond so that the X-ray averaging process takes place in the phosphor; for the second sensor a phosphor is chosen with a decay time which is much less than 0.1 microsecond so that the shape of the output pulse may be examined, in a manner to be described later. Many phosphors or scintillators are available which can be used. They are listed and described in standard texts. More recently introduced and worthy of mention here, however, are the plastic scintillators which offer high conversion efficiency, have a large dynamic range, and are unlimited in size and physical shape. They have decay times as short as $5 \times 10^{-9}$ seconds, are rugged, easily machined, and have a long shelf life. Also the optical fiber itself may comprise the scintillator, and therefore I refer to U.S. Patent No. 2,821,633 issued to H. Friedman, which discloses that Vycor glass emits radiation of 4000 A. whren subjected to X-radiation.

The location of the phosphor sensors is not critical since they are small in size, need no electrical connections, and are easily shield from undesirable radiation. It follows that spatial or directive filtering may be obtained by physical placement and by surrounding the sensor with simple collimating devices. Also, wavelength sensitive filters may be placed adjacent the phosphors to enhance the transmission of particular radiations and to attenuate others. Details concerning techniques useful for this purpose may be found in a variety of texts. Since the sensors are small and the light pipes flexible a substantial number of them can be used making it possible to monitor each major component within a high voltage assembly such as the power supply of FIGURE 6. Shown emanating therefrom, in accordance with this feature of the invention, is an optical cable 87 carrying a plurality of optical signals from inside the power supply. Each fiber of the cable carries a signal representative of the level of energization of a different component. These fibers are brought out to a panel 85 in the form of an optical termination where the technician or operator may make observations or measurements. Panel 85, for example, may conform to or be contiguous with the flush surface of an aircraft. Many such panels may be provided, each supplying test data from a different section of the aircraft. These panels are best located at different regions of the aircraft surface so that tests on each panel can be made simultaneously and independently. Further, since space often is at a premium, as on the flight deck of an aircraft carrier, it is possible to arrange these panels so that the test signals may be transmitted to a remote location. This may be done via optical cables, or by using a form of optical transmission in conjunction with the receiving device such as an image-orthicon or a vidicon. Thus, not only will it be possible to speed up the test procedure by providing a plurality of optical test panels, but the testing may be done remotely without causing electrical interference and without being subject to electronic countermeasures.

Figure 9:
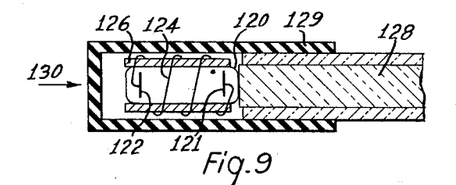
FIGURE 9 shows a gaseous detector of alternating magnetic fields in combination with an optical fiber for transmitting optical data from the detector representative of the magnetic field.

There is shown in FIGURE 9 a device for monitoring alternating magnetic fields, such as in the vicinity of a power transformer. Gas filled envelope 120 contains electrodes 121 and 122 connected to coil 124 which is wound around magnetic cylinder 126. Positioned adjacent envelope 120 is a light pipe or optical fiber 128. Surrounding the assembly is light tight member 129 which may consist of a rubber jacket. With this arrangement an alternating magnetic field, a component of which is shown at 130, will generate a voltage in coil 124 that will excite the gas within envelope 120. Visible radiation which is emitted thereby is transmitted via 128 and is then measured, or observed, to check the level of energization of the transformer. Alternatively, Hall effect devices which are small and long-lived are available for the measurement of magnetic fields. These devices are now used in gauss and flux meters and need not be discussed further at this point except to say that when the output is electrical in nature, a conversion to an optical signal may be desired. Again, means that will achieve this conversion are well known.

Figure 10:
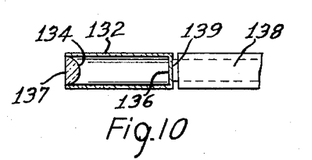
FIGURE 10 shows a vacuum detector utilizing a beta-emitting source and a phosphor target in combination with an optical fiber.

Another monitoring device is illustrated in FIGURE 10. Glass envelope 132 encloses a beta-emitting radio isotope 134. At the other end of the short evacuated tube is phosphor 136. This may be zinc oxide, which responds to an excitation of less than 10 electron-volts. Electrons emitted by 134 will be accelerated and will impinge upon phosphor 136 thereby generating a light signal proportional to the electric field. Optical member 138 then transmits the signals from the light emitting phosphor 136. Terminals 137 and 139 are connected to the emitter and the phosphor, respectively. By virtue of its sensitivity to low exciting voltages, this detector may be wired directly into transistor circuits to indicate signal levels therein. Also, the assembly of FIGURE 10 may be used in the place of gas-filled envelope 120 of FIGURE 9. In this case, connections are made to coil 124 via terminals 137 and 139.

Figure 12:
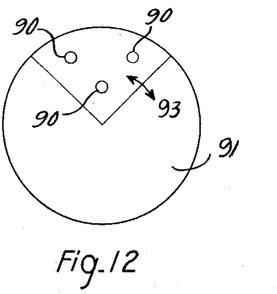
FIGURE 12 shows a tuning eye with optical fiber pick-ups.

Still another sensor is illustrated in FIGURE 12. Probes 90 are the terminations of optical fibers or light pipes which are brought up against the face of an electric eye 91 to monitor thereon the position of the fluorescent wedge 93. Conventionally, the tuning eye has been used in frequency modulation receivers to show the discriminator output voltage in automatic frequency control circuits. Optical fibers 90 may be positioned as shown therefore to transmit optical signals which indicate the effectiveness of control circuits of this type.

Figure 13:
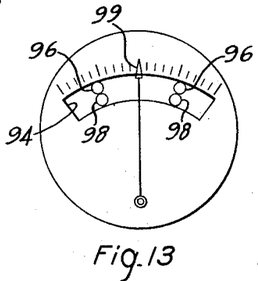
FIGURE 13 shows a meter face with optical fiber light sources and optical fiber pick-ups.

In FIGURE 13, optical probes 96 are used in conjunction with optical probes 98 to illustrate the application of optical fibers to devices with moveable members or surfaces. Consider the meter movement shown in the figure. A light source, transmitted from a remote location via optical fibers 96, is projected upon mirror 94, from where it is reflected into optical probes 98. Light signals will continue to be reflected from 94 and picked up by 98 until pointer 99 obstructs the light path. In this manner, a measure is provided of the position of the pointer. Clearly this type of arrangement can be used for distance measuring transducers, rotational devices, bore-sights, etc. Moreover, this arrangement can be adapted to provide a much broader range of optical stimulii. Thus, referring back to FIGURE 8, member 116 may be used to project ultra-violet radiation into the TR tube to maintain a suitable level of ionization within the tube as is now done with "keep-alive" electrodes. Also, the dual fibers may be used to conduct spectral analysis tests of rocket fuels and other chemical substances by projecting therein, via one of the fibers, an optical signal which is made to vary in wavelength and by measuring the response to this stimulus, via the other fiber.

A little reflection on the teachings of this invention up to this point makes it clear that a vast number of sensing devices are available at present, and many more may be anticipated, that will respond to energized components in operational systems. For electronic components it is seen that in many cases these sensors can be placed into position without disturbing the prior existing electronic circuitry. This advantage is substantial. For mechanical components, the dual light pipe-mirror combination can replace electrical potentiometers, rheostats, and the like. For chemical components, the dual light pipe-stimulii arrangement can provide, safely, measurements heretofore unobtainable in an operational environment. Furthermore, at least in the case of the electronic components it has been shown that by suitably connecting these sensors into the electronic circuits of the system it is possible also to control and regulate many of the critical electron devices contained therein. Lastly, the means disclosed to achieve these ends are small, rugged, and light-weight.

Except perhaps for filament 104 of FIGURE 7 (which can be designed for a reasonable life expectancy) and the beta-emitter of FIGURE 10 (which can be selected for a reasonable half-life period), these sensors have infinite life. They do not wear out. They will not be damaged by temporary overloads. They are not subject to burn-out and to drift. Hence, sensors of this type truly are reliable.

Figure 14:
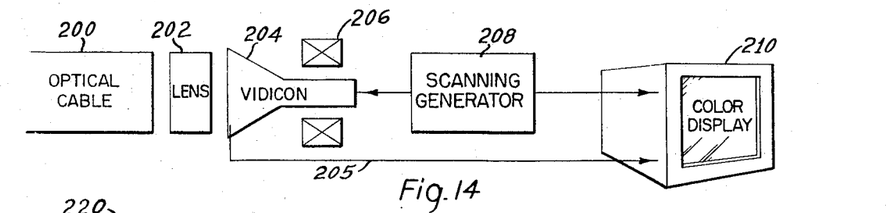
FIGURE 14 shows a vidicon tube with an optical cable input, scanning means, and a display for projecting the test results in color.

A method of utilizing the signals generated by sensors of this type is shown in FIGURE 14. Optical cable 200 has outside dimensions, in this case, of 1 inch x 1 inch. The individual fibers contained therein have a diameter of .033 inch so that an array, or matrix, is formed comprised of 30 x 30 optical fibers, or 900 test leads. Cable 200 is optically coupled to vidicon 204 via means 202 which might comprise a conventional lens, a flat fresnel lens, or a short optical fiber section. Means 202 may be dispensed with when cable 200 can be positioned directly against the vidicon. The 900 optical signals are stored on the target within vidicon 204. The target (and the vidicon) is approximately 1 inch square. The signals are released when the electron beam of the vidicon scans the target thereby producing electrical signals at output lead 205 as is well known. Scanning generator 208, deflection means 206, and display device 210 complete a closed circuit television chain. The display is arranged to reproduce the 30 x 30 matrix of test points. For a normal system the 900 points are made to cast a uniform pattern. For an abnormal system with a single fault, a single point on the matrix will differ from the rest. This will show up clearly on the display. Thus, by means of this invention it is made practical to introduce a tool for maintenance which employs techniques of the television industry. The test data, as well as the analysis thereof, can be collected and displayed at a rapid rate (e.g. 900 points at a 4 mc. rate). The test data can be transmitted to remote locations. The data can be stored. The data can be photographed. The data can be viewed directly. These possibilities did not exist heretofore on the scale disclosed and made practical by this invention.

Figure 15:
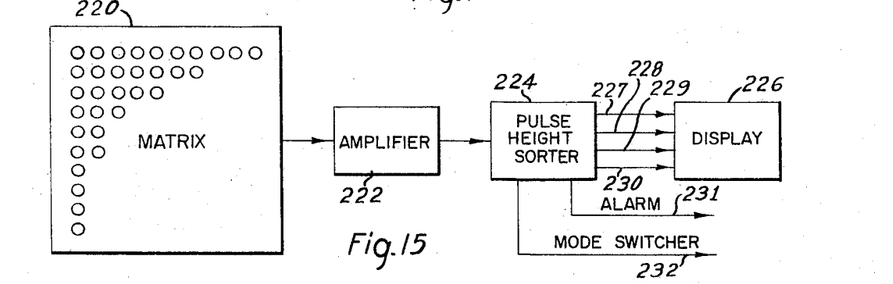
FIGURE 15 shows a matrix, corresponding to the target of a vidicon tube illuminated by an optical cable, with means for amplifying, sorting, and displaying the signals furnished by the target when scanned by an electron beam.

To illustrate this point with another example, the target screen of the vidicon in FIGURE 15 is illuminated by optical cable 220 with a 10 x 10 matrix. Using commercial television scanning rates of 525 lines and 62.5 microseconds per line, it will take only .033 second to trace out a complete raster. This means that the 100 points of test data can be rescanned 30 times a second. The pulses provided by amplifier 222 are sorted in means 224 so that signals of normal amplitude are displayed in white, via lead 227, on means 226. Signals above a certain tolerance are displayed via 228 in red. Signals below tolerance are displayed via 229 in green. Input 230 to display 226 may be used to generate a self-test color pattern. This color coding obviously will assist the observer in interpretating the display. Intermittent faults, for example, which ordinarily are difficult to recognize and analyze will show up as a red and green flicker in a normally white test point. This behavior is sure to catch the attention of the observer.

The arrangements of FIGURES 14 and 15 use a plurality of sensors to provide test data, optical fibers for transmission of the data, a vidicon for temporary storage of the data, and a closed circuit television chain for further transmission and display. The vidicon is one of the most simple, reliable, and rugged components available in the electronics industry. It is light in weight and small in size. These desirable characteristics match those of the sensors and the optical fibers. A color display device which matches the vidicon, the sensors, and the optical fibers for simplicity and reliability is disclosed in my co-pending application Ser. No. 800,854, filed Mar. 20, 1959, now Patent No. 3,081,414, entitled, "Wide Band Cathode Ray Tubes," and related patents.

Figure 16:
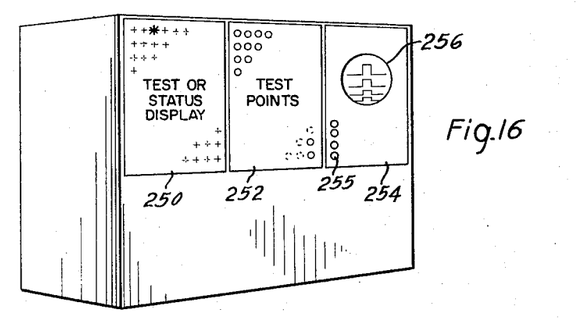
FIGURE 16 shows a central monitoring station with electrical and optical test points and an oscilloscope.

An arrangement is outlined in FIGURE 16 which shows one form that a physical embodiment of this invention may take when applied to a complex system. Visual display 250 is provided directly by optical fibers, as previously set forth, to yield an output for viewing by an observer. The display is arranged to match colors, intensities, flicker rates, etc., as is best decided by a study of the entire system from a human-engineering viewpoint. Test point section 252, adjacent the visible display, is provided so that measurements may be made of individual wave shapes. For this purpose oscilloscope section 254 is provided. It is to be remembered that for each sensing position a detector is recommended with response time and decay characteristics suitably matched to the purpose of measurement. For example, high speed phosphors may be used to transmit video pulses in the microsecond range. They are suitable also for transmitting other signals such as sine waves, provided the frequency thereof is not excessive. Phosphors with a slower decay may be used to average sinusoids, or pulses, and therefore may respond to the envelope thereof. Following considerations of this nature, the test point panel 252 is set up so that the wave shapes of signals may be selected for viewing by oscilloscope section 254. A plurality of inputs to the oscilloscope are shown at 255 and a plurality of signal traces are shown at 256 to illustrate how the synchronism of different circuits within the system under test may be examined. Test point section 252 may be composed of both electrical and optical test points. Waveshape measurements of signals at the electrical test points are made conventionally. The description of FIGURE 17 will describe the use of the optical test points for waveshape measurements. It should be appreciated, however, that even without making waveshape measurements the central monitoring position 250 provides a complete and continuously up-dated display which gives the operator or technician a rapid view of the status of the entire system. He can determine the readiness of the system at one glance.

Figure 17:
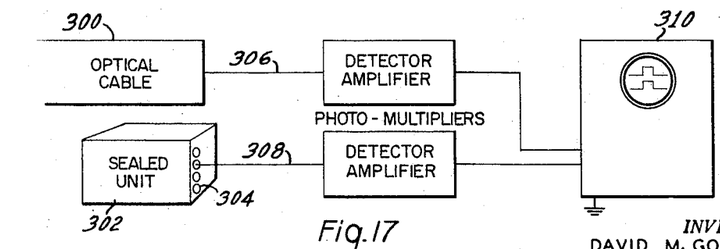
FIGURE 17 shows a versatile general purpose test device comprised of an optical probe, detector, and oscilloscope, which may be used at a central monitoring station or at local optical test point feeders in a complex system.

In FIGURE 17 optical cable 300 provides a matrix of test points. Assembly 302, which may be vacuum sealed, also provides optical test points 304. Signals are present at these points which reveal the level of energization of various components, as previously described. In certain cases the signals will represent instantaneous energy levels, in other cases, the signals will represent time averaged values of energization. To examine the waveshape of these signals optical probes 306 and 308 are provided. These probes, akin to electrical test prods, are flexible shielded optical fibers and have an exposed optical contact area which is to be positioned against the various test points. The data thus picked up is transmitted along the fiber to detector-amplifiers which provide an electrical output corresponding to the optical signals. These electrical signals are portrayed on oscilloscope 310. The advantages of this arrangement are numerous. The atmosphere, or lack of it, surrounding sealed unit 302 will not interfere with the measurements. The optical signals are easier to handle than their electrical counterpart from the point of view of voltage breakdown, electrical interference, and electrical countermeasure, and are safer to handle in a hazardous or explosive environment. More important though, this arrangement of elementary components provides a versatile wide-band test combination. The optical fibers have virtually an unlimited bandwidth. The plastic phosphors are extremely fast. The detector-amplifier, which may be an RCA–931 photomultiplier, has a bandwidth of approximately 100 mc. Conventional oscilloscopes, which would limit the overall speed of response of this test combination, are available with a 30 mc. bandwidth, and higher. Lastly, sampling attachments can be used with repetitive signals to present fast pulses furnished by the detector-amplifier on a low bandwidth oscilloscope.

In summary, this invention provides means for sensing operative components in an electronic system to provide signals in the optical frequency range which are displayed and analyzed so that a complete picture is presented of the manner in which the system is behaving. It is contemplated that, in the practice of this invention, a wide assortment of sensing devices will be used. The system, and its sub-assemblies, will be instrumented according to sound design techniques. The function to be performed by the system, the operational environment, the logistic support plan, the predicted failure rates, the anticipated life expectancy of the components, the skill level of the operators and of the maintenance people, are considerations which will all have a bearing on the design of the system and the selection of sensing devices to be provided therein. Likewise, these considerations will determine the method of choice for the collection, analysis, and display of the test data.

It is my belief that a major breakthrough will be achieved in the electronics art if a consideration of the teachings of the sort disclosed by this invention be made mandatory in the design of new electronic components and systems. The designer then will be forced to include in his equipment suitable test features and test points which have been so noticeably lacking in many electronic systems. It will then be possible to test a complex system rapidly and reliably so that its operational status may be determined with a degree of certainty not presently available.

Having thus described my invention, and some of the uses to which it can be put, I claim:

1. The method of non-destructive automatic testing of an energizeable assembly of electronic components which comprises the steps of: (1) interspersing a plurality of optical fibers throughout the assembly of components, said fibers having entrance and exit terminals, (2) positioning the entrance end of selected fibers in different regions of space so as to be impinged upon by electromagnetic radiation emanating from different parts of the assembly, (3) positioning the exit terminals of the selected fibers to form a matrix of optical test points, (4) energizing the assembly of components, (5) imaging the optical signals emerging from the matrix of optical test points on to a storage target, (6) scanning the target with a beam of energy thereby to provide electrical signals, (7) comparing the electrical signals to reference signals, and (8) displaying the results of said comparison.

2. The method of claim 1 wherein the process of scanning the storage target is effectuated by a scanning electron beam.

3. The method of claim 2 wherein the scanning electron beam also erases the data stored on the target.

4. The method of claim 3 wherein the scanning electron beam erases the data stored on the target and simultaneously provides electrical signals corresponding to the optical signals stored on the target.

5. The method of claim 1 including the step of displaying the results in a matrix format which corresponds to the matrix format of the optical test points.

6. The method of claim 5 including the step of displaying the results in a first color for signals of normal value, in a second color for signals above a pre-determined tolerance, and in a third color for signals below a pre-determined tolerance.

7. The method of claim 6 wherein the scanning rate across the storage target is fast enough so that intermittently varying signals are displayed as points in the matrix which flicker in color thereby more readily attracting the attention of an observer.

8. The method of non-destructive automatic testing of an energizeable assembly of electronic components which comprises the steps of: (1) interspersing a plurality of optical fibers throughout the assembly of components, said fibers having entrance and exit terminals, (2) positioning the entrance end of selected fibers in different regions of space so as to be impinged upon by electromagnetic radiation emanating from different parts of the assembly, (3) positioning the exit terminals of the selected fibers to form a matrix of optical test points, (4) energizing the assembly of components, (5) imaging the optical signals emerging from the matrix of optical test points on to a storage target, (6) scanning the target with a beam of energy thereby to provide electrical signals, (7) comparing the electrical signals to reference signals, and (8) recording the results of said comparison.

9. In an arrangement for the non-destructive automatic testing of an energizeable assembly of electronic components, in combination, a plurality of optical fibers interspersed throughout the assembly of components, said fibers having entrance and exit terminals, with the entrance portion of selected fibers being positioned in different regions of space so as to be impinged upon by electromagnetic radiation emanating from different parts of the assembly, and with the exit terminals of the selected fibers being positioned to form a matrix of optical test points; means for energizing the assembly of components; means for imaging the optical signals emerging from the matrix of optical test points on to the storage screen of a vidicon tube; means for scanning the screen of the vidicon with its scannable electron beam thereby to provide a sequence of electrical signals indicative of the imaged optical signals; means for comparing the electrical signals to reference signals; and display means, synchronized with the scanning action on the storage screen, for displaying the results of said comparison.

10. The arrangement of claim 9 including scintillator means positioned proximate the entrance terminals of the optical fibers, thereby to convert the impinging electromagnetic radiation to a lower frequency signal which is capable of being transmitted through the light pipe.

11. The arrangement of claim 10 wherein said scintillator means is a scintillating optical fiber.

12. In an arrangement for the non-destructive testing of an assembly of energizeable electronic components connected in circuit, in combination, a plurality of optical fibers having entrance and exit terminals, the entrance end of the fibers being positioned to be impinged upon by electromagnetic radiation emanating from different parts of the assembly, and wherein the exit terminals of the optical fibers are brought together to form a matrix of optical test points whereby the optical signals emerge for test purposes; an additional optical fiber positioned to receive at its input end electromagnetic radiation from a source external of the assembly; a source of radiation; means for causing said radiation to impinge upon the input end of the additional fiber whereby the radiation is transmitted through the fiber to its exit end; and detection means, responsive to the radiation emitted from said exit end, which provide an electrical output signal; and circuit means for connecting said electrical output signal to the components connected in circuit thereby to energize said electronic components.

13. The arrangement of claim 12 wherein the assembly of components and the optical fibers associated therewith are contained in a sealed housing, and wherein the exit terminals comprising the matrix of optical test points are brought together flush with an exterior surface of the sealed housing.

14. The arrangement of claim 13 wherein the additional optical fiber, used for energizing the components, has its input end positioned in the matrix of optical test points.

15. In combination: a triggerable electron discharge device comprising two electrodes adapted to have a voltage applied therebetween in order to cause an abrupt electrical discharge to occur between the electrodes, a remote light source, and optical fiber means having entrance and exit terminals; wherein the entrance terminal of the optical fiber is positioned with respect to the light source so as to receive input electromagnetic radiation in the optical frequency range which is transmitted to the exit terminal of the optical fiber, and wherein said exit terminal is positioned so that radiation which emerges therefrom illuminates the region in which the two electrodes are located, thereby to generate sufficient charged particles to cause the electrical discharge to take place in the presence of the applied voltage.

16. The combination of claim 15 wherein the triggerable electron discharge device comprises a gas filled envelope surrounding the two electrodes, and wherein the optical fiber is positioned to transmit ultraviolet radiation from the source through the envelope, thereby to ionize the gas between the two electrodes.

17. A test system comprising, in combination, a hermetically sealed assembly of electronic components adapted to be energized for test purposes; an optical test point matrix sealed to an exterior surface of said assembly; means for generating optical signals representative of the level of energization of at least some of said components; a plurality of optical fibers for transmitting said optical signals to said matrix of test points; an electron discharge device having a radiation-sensitive storage type target screen adapted to be scanned by an electron beam furnished by said device; means for transmitting the optical signals from said optical test point matrix to said radiation-sensitive target screen; means for scanning the electron beam across said target screen thereby to generate electrical signals corresponding to said optical signals, and thereby simultaneously erasing the optical signals stored on said screen; a display screen; means for generating a matrix pattern on said display means corresponding to the pattern of the optical test point matrix; and means responsive to said electrical signals for comparing the test data to reference data and for controlling the luminescence of the test data as presented on said display screen.

18. The combination of claim 17 wherein the means for generating the optical signals comprise scintillator means positioned proximate the entrance end of the optical fibers.

19. The combination of claim 17 including an external source of light, an additional optical fiber, and a photon detector adapted to provide an electrical output arranged so that light from the source impinges upon the exteriorly disposed end of the fiber, is transmitted therethrough to its exit termination to impinge upon the interiorly disposed photon detector, thereby providing an electrical output used for energizing the electronic component.

20. The method of non-destructive testing a plurality of electronic components connected in circuit and adapted to modulate the amplitude of carrier waves of an oscillatory nature comprising the steps of (1) interspersing a plurality of optical fibers in spaced apart positions with respect to the components and circuits under test, and (2) placing a plurality of scintillators, responsive to X-rays emitted by said components when energized, so as to be impinged upon by the X-rays, and (3) causing the electro-magnetic radiation emitted by selected scintillators to enter the entrance portion of selected optical fibers, and (4) arranging the exit portions of the optical fibers to form a matrix of optical test points, and (5) bringing an optical probe to a selected point in the matrix thereby to convey the optical signal emanating therefrom to a point remote from the matrix, and (6) detecting the optical signal transmitted by the probe thereby to furnish a time varying electrical signal, and (7) connecting the electrical signal to a cathode ray tube thereby displaying the variation in time of the electrical signal.

21. The method of claim 20 wherein the scintillators are provided with a decay time which is short in comparison to the rise and fall time of the modulating waveforms but long in comparison to the period of the oscillatory carrier wave, thereby causing the electrical signal displayed on the cathode ray tube to be a replica of the modulating waveforms.

22. The method of claim 21 wherein a plurality of optical probes are placed on the matrix of optical test points and wherein a plurality of electrical signals thus derived are displayed simultaneously on the cathode ray tube.

23. In an arrangement for sequentially sampling a plurality of discrete, independently variable optical data signals, the combination comprising: a photon-sensitive, erasable and re-usable, storage type target screen; means comprising a plurality of optical fibers having spaced apart entrance portions, and exit terminals, for transmitting the optical data signals in matrix format upon said photon-sensitive storage type target screen; electron beam means for providing a scannable electron beam; means for scanning the electron beam across the target screen, thereby to provide a series of electrical signals representative of the optical signals which were stored on said screen and simultaneously erasing said stored signals in order to make the target screen receptive to the storage of new optical signals; and means for comparing the series of electrical signals to reference signals and displaying the results of said comparison.

24. In an arrangement for sequentially sampling a plurality of data signals derived from spaced apart locations, the combination comprising: means for transducing the data signals in order to provide a plurality of discrete optical signals; a plurality of optical fibers having spaced apart entrance portions, and exit terminals; means for positioning the entrance portions of selected optical fibers, with respect to the plurality of discrete optical signals, so as to selectively pick up the optical signals and transmit them to the exit terminals of the optical fibers; means for positioning the plurality of exit terminals in matrix format; a photon-sensitive, erasable, and re-usable, storage type target screen disposed so as to be impinged upon by the optical signals which emanate from the matrix of exit terminals; a scannable beam of energy; means for scanning said beam across the target screen, thereby to provide a series of signals representative of the optical signals which were stored on said screen; and means for erasing said stored signals in order to make the target screen receptive to the storage of new optical signals.

25. The combination of claim 23 including means for displaying the results of comparison in a first color for signals of normal value, in a second color for signals above a pre-determined tolerance, and in a third color for signals below a pre-determined tolerance.

26. The combination of claim 24 wherein the scanning process is effectuated by a scanning electron beam, and wherein the erasing process occurs simultaneously with the scanning process.

27. The combination of claim 24 including means for comparing the series of signals to reference signals and continuously displaying the results of the comparison.

28. The combination of claim 27 including means for displaying the results of comparison in a first color for signals of normal value, in a second color for signals above, a pre-determined tolerance, and in a third color for signals below a pre-determined tolerance.

29. The combination of claim 25 including means in the display means for providing a viewable multi-color matrix format wherein intermittently varying results are displayed in flickering colors.

30. The combination of claim 28 including means in the display means for providing a viewable multi-color matrix format wherein intermittently varying results are displayed in flickering colors.

References Cited by the Examiner

UNITED STATES PATENTS

| | | | |
|---|---|---|---|
| 1,751,584 | 3/1930 | Hansell | 88—1 |
| 2,043,099 | 6/1936 | Hanna | 317—9 |
| 2,196,040 | 4/1940 | Thompson | 313—10 X |
| 2,256,595 | 9/1941 | Metcalf | 88—1 |
| 2,468,045 | 4/1949 | DeLoraine | 88—1 |
| 2,506,672 | 5/1950 | Kell | 250—227 X |
| 2,509,815 | 5/1950 | Elliot | 324—122 X |
| 2,567,036 | 9/1951 | Shannon | 250—227 |
| 2,573,373 | 10/1951 | Wales. | |
| 2,860,244 | 11/1958 | Crowley | 317—9 X |
| 2,865,978 | 12/1958 | Modrey | 174—47 X |
| 2,878,450 | 3/1959 | Rabier | 324—121 |
| 2,915,659 | 12/1959 | Goodman | 250—227 X |
| 2,931,905 | 4/1960 | Caha. | |
| 2,951,736 | 9/1960 | Black | 88—1 |
| 2,957,133 | 10/1960 | Burkhart | 324—73 |
| 2,962,659 | 11/1960 | Neill | 324—73 |
| 3,029,717 | 4/1962 | Hildebrandt | 88—1 |
| 3,051,166 | 8/1962 | Hovnanian | 250—227 X |
| 3,058,021 | 10/1962 | Dunn. | |
| 3,068,739 | 12/1962 | Hicks | 250—227 X |
| 3,138,709 | 6/1964 | Cassen | 250—227 X |
| 3,181,046 | 6/1965 | Savalli | 250—227 X |

OTHER REFERENCES

RCA Technical Notes, Issue #3, T.N. #136 (Davidson) March 1958.

Scientific American (Collins), November 1953, pp. 36–41.

WALTER L. CARLSON, *Primary Examiner.*

FREDERICK M. STRADER, *Examiner.*

R. V. ROLINEC, G. S. KINDNESS, E. L. STOLARUN,
*Assistant Examiners.*